(No Model.)  2 Sheets—Sheet 1.

E. Y. KNAPP.
LUMBER MEASURING INSTRUMENT.

No. 319,911.  Patented June 9, 1885.

WITNESS:
Geo. A. Dickson
Jno L Taggard

INVENTOR:
Edward Young Knapp
by E. H. Osborn
Attorney.

(No Model.) 2 Sheets—Sheet 2.
E. Y. KNAPP.
LUMBER MEASURING INSTRUMENT.
No. 319,911. Patented June 9, 1885.
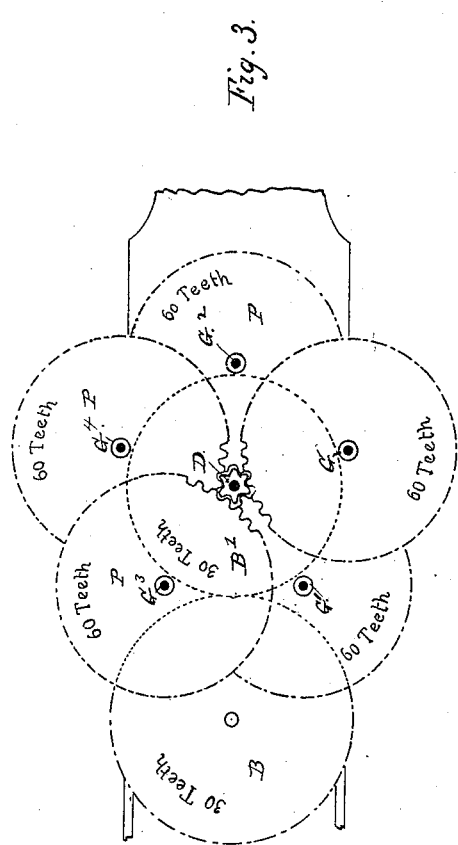
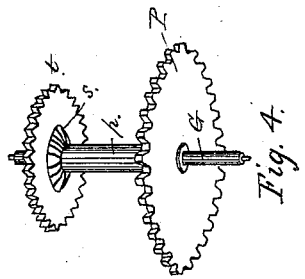
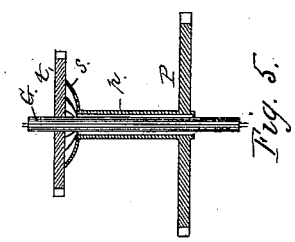
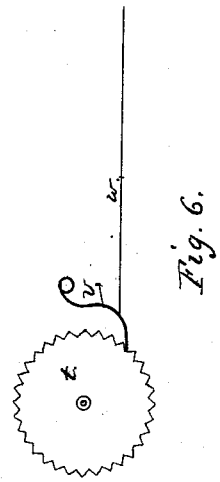
WITNESS:
Geo. A. Dickson
Jno. L. Taggard
INVENTOR:
Edward Young Knapp
by _____ Attorney.

UNITED STATES PATENT OFFICE.

EDWARD YOUNG KNAPP, OF ARCATA, CALIFORNIA.

LUMBER-MEASURING INSTRUMENT.

SPECIFICATION forming part of Letters Patent No. 319,911, dated June 9, 1885.

Application filed November 10, 1883. (No model.)

*To all whom it may concern:*

Be it known that I, EDWARD YOUNG KNAPP, a citizen of the United States, residing at Arcata, county of Humboldt, and State of California, have made and invented certain new and useful Improvements in Lumber-Measuring Instruments; and I do hereby declare that the following is a full, clear, and exact description of my said invention, and of the manner in which I proceed to construct, apply, use, and carry out the same, reference being had by figure and letter to the accompanying drawings.

My invention relates to mechanical devices for measuring and recording the number of feet and divisions thereof in lumber; and it consists in certain novel construction and combination of parts and mechanism, as hereinafter more fully described and pointed out, producing a machine or instrument with the capacity to measure lumber in piles of mixed lengths and thicknesses, as well as in piles of uniform sizes of boards or planks, and to calculate and record the gross number of feet in any pile or number of boards.

Figure 1:
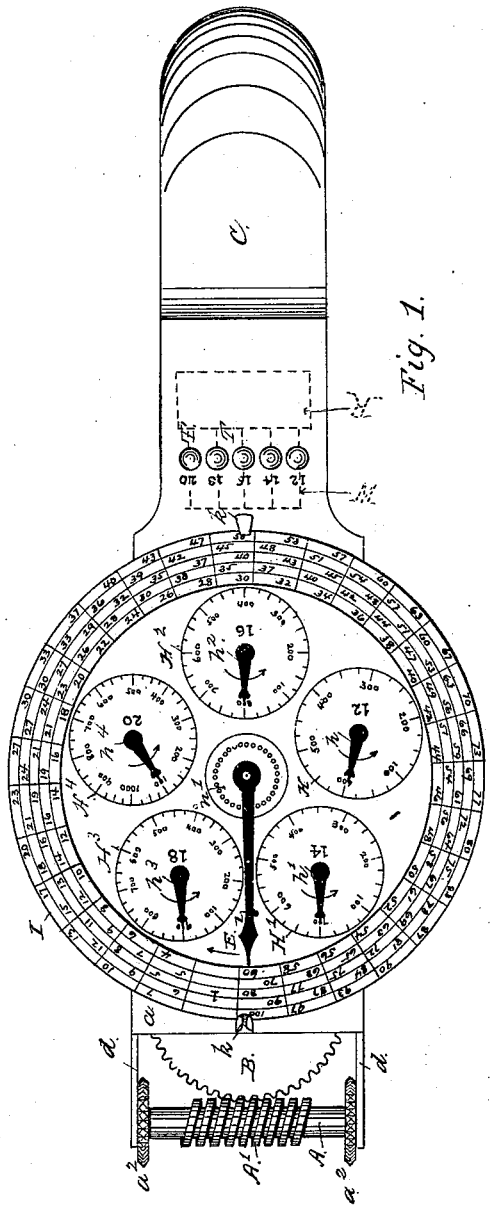
Figure 2:
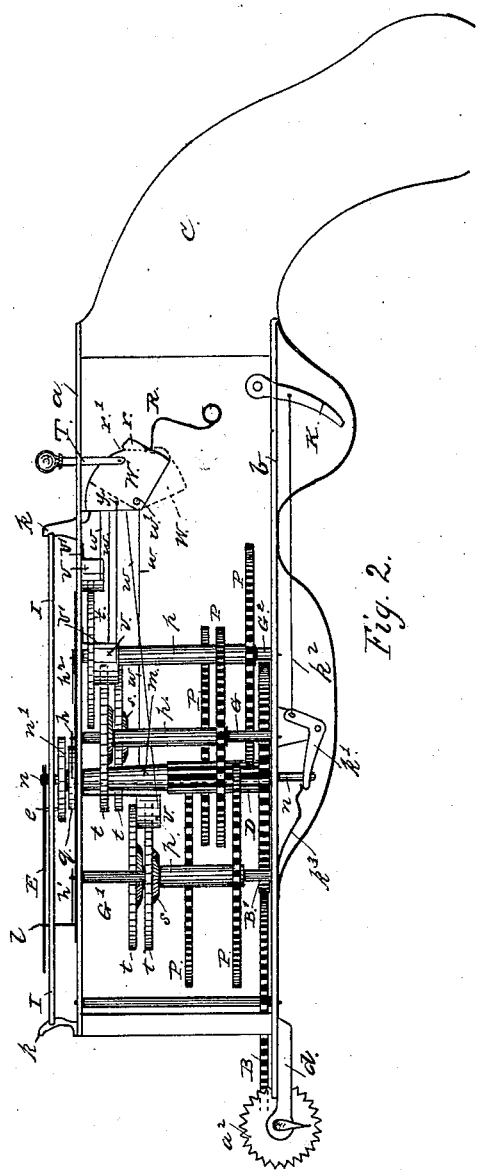

In the accompanying drawings referred to, Figure 1 is a plan or top view of the instrument complete and ready for use. Fig. 2 is a side elevation, with the side of the case removed. Fig. 3 shows the proportions and arrangement of the train of gears. Figs. 4, 5, and 6 are details of the driving mechanism, by which the index-hands are operated, and of the locking devices by which they are thrown out of action.

A suitable frame or case has top and bottom plates, $a\ b$, a handle, C, at one end, and at the front or opposite end two bearings, $d\ d$, for the axle of a barrel, A, carrying a worm, A'. This worm is the prime mover of all the mechanism. It receives rotation by means of a pair of notched, barbed, or roughened wheels, $a^2\ a^2$, fixed upon the barrel at the outer ends, their edges being of a character adapted to take hold of the surface of a board, and to impart rotation to the barrel as it is pushed forward over such a surface. The revolutions of this barrel are transmitted to a central pinion, D, by toothed wheels B B', and from the pinion D motion is given to a number of arbors, G G' G², &c., carrying index-hands $h\ h'\ h^2$, &c. In each of these hands there is a dial, H H' H², &c., having graduations according to the size of the plank to which each hand is appropriated and made to register. Thus the hand $h$ being applied to register twelve-feet lumber, its dial H is divided accordingly, and so in like manner the dial H' is graduated for fourteen-feet stuff, the dial H² for sixteen feet, and the dials H³ and H⁴ for eighteen and twenty feet. For compactness and greater convenience the dials are arranged in a circle around the central arbor, and they are laid off and marked or suitably stamped upon the top plate, $a$. Above the face of this plate is a circular scale, I, that constitutes the dial of a large index-hand, E. This dial is removable, and it is held by two spring-clips, $k\ k$, that are fixed in the top plate, as seen in Fig. 1. The graduations upon this ring are laid off in inches, and five separate scales are provided upon the one ring, from which the dimensions for five different lengths of boards are obtained—that is, for twelve, fourteen, sixteen, eighteen, and twenty feet, respectively, but of uniform thickness. To adapt the instrument to measure stuff of other and several different thicknesses, a number of these annular scales I are used, as the scale that is divided to give dimensions of one-inch boards must be removed and the proper scale substituted for it in measuring one-and-a-quarter-inch stuff, and so on. The scale represented in Fig. 1 is graduated for one-inch stuff, the smallest circle of graduations representing the dimensions of twelve-feet boards, and each circle beyond increasing in regular order, according to the standard lengths of boards, the outermost circle giving dimensions for twenty-feet boards. The graduations in this scale I represent each two inches, which is the exact measurement of the circumference of the measuring-wheels on the barrel A, and therefore as these wheels make one complete revolution against the surface of a board, the hand E is caused to move the distance of one of the spaces on the dial. If the stuff being measured is of twelve-feet length the figures on the smallest circle will be read, while the other circles will give the dimensions for the other standard lengths, as before described.

The index-hands $h\ h'$, &c., receive motion from the measuring-wheel through the following train of gearing: The wheels B B', of thirty teeth each, drive the central pinion, D, of six teeth, and from this pinion each arbor G receives motion through the medium of a gear, P, of sixty teeth. This proportion of gears is found necessary, in order to obtain equal divisions of all the dials H into hundredths. Such combination of wheels would give a general movement of all the hands $h$ $h'$, &c., were the wheels P fast on their arbors; but each index being required for operation only when that length of board to which it is appropriated is to be measured, it is necessary to throw the arbors G G', &c., into and out of gear as the particular index of each is to be used. For this purpose each wheel P is attached to its arbor by a sleeve or long hub, $p$, having a friction-washer, $s$, fixed to or made in one piece with the hub, and bearing against the under side of a ratchet-wheel, $t$, that is fast on the arbor. Contact of the wheel $t$ and the hub $p$ gives sufficient friction to lock the two wheels together under ordinary conditions; but when the ratchet-wheel is locked the arbor is held at rest, and the wheel P runs idly without operating the index $h$.

To each ratchet-wheel $t$ there is a spring-pawl, $v$, connected by a wire, $w$, with a plate, W, at the back part of the case. Each arbor G has its spring-pawl, and the plates W of the whole set are mounted loosely upon a rod, $w'$, that extends across the case just in front of the handle. To each plate there is a push-pin terminating in a knob, T, outside the case, and suitably numbered to correspond with the dial and index, upon which it operates or the runner of which it controls.

The wire $w$ of each pawl connects with its own plate W at a point, $y$, above the center $w'$, so that by pressing down the knob T the pawl will be drawn back and the arbor ratchet-wheel $t$ released. When thrown back in this manner the plate W is held by the spring R, and until released from this spring these connections W $w$ keep the pawl clear of the ratchet-wheel.

In practice only one of the index-hands $h$ $h'$, &c., will be in use at a time, and therefore I have provided for the release of one plate, W, from the spring R, as any other one of the plates is pressed back for action. This is produced by using a single wide spring, R, as shown in edge view, Fig. 2, and dotted in plan view, Fig. 1, and then forming an offset or outward projection, $r$, on the back edge of the plate W, where it bears against the edge of the spring, so as to give a notch, $r'$. Pressure upon the knob of any plate throws it back until the spring rides over and takes into the notch $r'$; but by reason of this movement of the plate the spring is also pressed back, and therefore if another plate is at such time held back by the spring R, this last-named plate will be released by the action of the first-named plate upon the spring, which will allow the pawl of the last-named plate to spring into action against the ratchet wheel $t$. The pawls $v$ are mounted on spring-arms $v'$, that are secured to the under side of the plate $a$, and when released they spring forward of themselves into the ratchet-wheels. As one of the knobs T is pressed down to set back any one of the pawls, it has the effect also to release whatever one of the pawls has been previously set.

The trigger K and connected parts, as seen in Fig. 2, are provided for the purpose of throwing back the principal pointer E to zero on the scale when setting the instrument each time for use. These parts are a spindle, $n$, extending through and working loosely in the sleeve $m$, of which the pinion D is a part, a disk, $n'$, fixed on the top end of the sleeve outside the plate $a$, and a pin, $e$, projecting from the lower face of the pointer E, which is fast upon the spindle. This disk $n'$ has a circular row of holes in its upper face to receive the end of the pin $e$, and by engagement with one of these holes the pin serves to lock the pointer to the sleeve $m$. The lower end of the spindle is stepped on a bell-crank lever, $k'$, to one end of which the trigger K is connected by a wire, $k^2$, while a spring, $k^3$, bears upon the other end of the lever to keep it depressed. Thus, under ordinary conditions when in operation, this spring $k^3$ holds the pin $e$ against the disk $n'$, and by this clutch locks the pointer to the sleeve.

In the operation of resetting the pointer, pressure upon the trigger will draw up the spindle and raise the pin $e$ clear of the disk $n'$, and the action of a small coil-spring, $q$, attached to the spindle just below the disk $n'$, will then throw the pointer around until it strikes a stop-pin, $l$, which will bring the end of the pointer opposite to zero in the scale I.

To measure a pile of boards of mixed lengths with this instrument, the hands are all turned back to zero on the dials, and the measure of the first board in the pile is taken by running the instrument across its face breadthwise. At the same time the proper index $h$ is brought into action to record the measure upon its dial. The large pointer E will give the dimensions of the single board; but to measure the next board in the pile this pointer must first be brought back to zero, so the smaller index-hand $h$ is brought into service to record the gross measurement. Suppose, for example, that the first three boards in a pile are sixteen feet lengths, the operator will first throw the hand $h^2$ of the sixteen-feet dial $H^2$ into action by pressing the button at 16 on the handle. The measurements will then be registered on this dial; but if the next boards should run in lengths of twelve feet, this dial $H^2$ must be thrown out of play and the dial H used. This is done by simply depressing the button marked 12, and by the same movement the holding-back plate W of the locking-pawl, first drawn back, is released, and the hand of the dial $H^2$ is then locked and held from moving either way. In like manner the hands of all the dials are alternately brought into and thrown out of action as required, so that at the end of the operation the gross amount of each length is read from its respective dial, while the whole amount of lumber in the pile is obtained by simply adding the results together.

The pointer E and its scale I alone will show the measurement of a single board or plank.

Having thus fully described my invention, what I claim, and desire to secure by Letters Patent, is—

1. The combination, with the barrel A, having measuring-wheels $a^2$ and worm A', of the gear B, pinion D, and the series of wheels P, loosely mounted upon upright arbors G, and mechanism, substantially as described, for locking each wheel to its arbor, and means, substantially as described, for locking the arbor when the wheel is released, substantially as hereinbefore described.

2. The combination, with the upright arbors G, of wheels P loose thereon, the friction-clutches and ratchet-wheels $t$, and the pawls $v$ and the mechanism described for throwing them separately into and out of action, substantially as hereinbefore described.

3. The combination, with the ratchet-wheels $t$, of the pawls $v$, the series of plates W, the connecting-wires $w$, spring-plate R, and the push-rods T.

4. The combination of the sleeve $m$, forming part of the driving-pinion D, the loose spindle having index-hand E, the pin $e$ on the hand E, the coil-spring $q$, and means for throwing up the spindle, and a spring for returning it into position to couple the hand to the sleeve, substantially as hereinbefore described.

EDWARD YOUNG KNAPP. [L. S.]

Witnesses:
  G. W. EMERSON,
  JNO. L. TAGGARD.